(12) United States Patent
Sato et al.

(10) Patent No.: US 11,902,700 B2
(45) Date of Patent: Feb. 13, 2024

(54) RECORDING DEVICE, RECORDING METHOD, AND PROGRAM

(71) Applicant: JVCKENWOOD Corporation, Yokohama (JP)

(72) Inventors: Takayuki Sato, Yokohama (JP); Fumio Tsukamoto, Yokohama (JP); Hirohiko Yasue, Yokohama (JP); Yusuke Yamaguchi, Yokohama (JP); Masahiro Yamane, Yokohama (JP); Sho Watanabe, Yokohama (JP); Junichi Kasuya, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/726,392

(22) Filed: Apr. 21, 2022

(65) Prior Publication Data

US 2022/0247969 A1    Aug. 4, 2022

Related U.S. Application Data

(63) Continuation of application No. PCT/JP2020/046014, filed on Dec. 10, 2020.

(30) Foreign Application Priority Data

Dec. 20, 2019    (JP) .................................. 2019-230078

(51) Int. Cl.
*G06F 21/62*    (2013.01)
*G06V 20/56*    (2022.01)
*G07C 5/08*    (2006.01)
*G11B 27/031*    (2006.01)
*H04N 9/82*    (2006.01)
*H04N 5/77*    (2006.01)
(Continued)

(52) U.S. Cl.
CPC ............ *H04N 5/77* (2013.01); *G06F 21/6209* (2013.01); *G06V 20/56* (2022.01)

(58) Field of Classification Search
None
See application file for complete search history.

(56) References Cited

U.S. PATENT DOCUMENTS

2007/0150138 A1* 6/2007 Plante .............. H04N 21/42692
701/33.4
2020/0252577 A1    8/2020 Teruuchi

FOREIGN PATENT DOCUMENTS

EP          3933396 A1 *  1/2022  ........... G01N 29/041
JP       2012169754 A  *  9/2012
(Continued)

*Primary Examiner* — Hung Q Dang
(74) *Attorney, Agent, or Firm* — Procopio, Cory, Hargreaves & Savitch LLP

(57) ABSTRACT

A recording device includes an acquisition unit configured to acquire predetermined information including at least an image of an area around a vehicle, a recording unit configured to record the predetermined information acquired by the acquisition unit as a file, a playback unit configured to play back a designated file among a plurality of files recorded in the recording unit, and a file management unit configured to extract a file recorded in a period substantially continuous in time series with a file being played back from the plurality of files and protect writing of the extracted file. Thus, it is possible to provide a recording device capable of preventing writing of a file related to a file being played back.

5 Claims, 4 Drawing Sheets

(51) Int. Cl.
*G07C 5/00* (2006.01)
*G11B 20/10* (2006.01)
*H04N 5/76* (2006.01)
*H04N 23/50* (2023.01)

(56) References Cited

FOREIGN PATENT DOCUMENTS

| | | |
|---|---|---|
| JP | 2014-220803 A | 11/2014 |
| JP | 2019-169191 A | 10/2019 |
| JP | 2019-200777 A | 11/2019 |

\* cited by examiner

RECORDING DEVICE, RECORDING METHOD, AND PROGRAM

CROSS REFERENCE TO RELATED APPLICATION

This application is based upon and claims the benefit of priority from Japanese patent application No. 2019-230078, filed on Dec. 20, 2019, the disclosure of which is incorporated herein in its entirety by reference.

BACKGROUND

The present disclosure relates to a recording device, a recording method, and a program.

A technique for protecting writing of predetermined data in a recording device is known. Japanese Unexamined Patent Application Publication No. 2019-169191 discloses a recording device which, when an event signal indicating an occurrence of an event in a vehicle on which the recording device is mounted is acquired, writes image data from the time when the event signal is acquired to the time when it is detected that a predetermined condition is satisfied in a memory in such a way that the image data will not be overwritten.

SUMMARY

In a recording device, there is a need to play back a recorded file while the file is being recorded. In a recording device in which an old file is overwritten and recorded when a capacity of a storage unit is exhausted, it is necessary to prevent writing of a file related to a file being played back (including the file being played back).

In an example aspect of the present disclosure, a recording device includes: an acquisition unit configured to acquire predetermined information; a recording unit configured to record the predetermined information acquired by the acquisition unit as a file; a playback unit configured to play back a designated file among a plurality of files recorded in the recording unit; and a file management unit configured to extract a file recorded in a period substantially continuous in time series with a file being played back from the plurality of files and protect writing of the extracted file.

In another example aspect of the present disclosure, a recording method includes: acquiring predetermined information; dividing the acquired predetermined information into a plurality of files and recording the plurality of files; playing back a designated file among the recorded plurality of files; and extracting a file recorded in a period substantially continuous in time series with a file being played back from the plurality of files and protecting writing of the extracted file.

In another example aspect of the present disclosure, a program causes a computer to execute: acquiring predetermined information; dividing the acquired predetermined information into a plurality of files and recording the plurality of files; playing back a designated file among the recorded plurality of files; and extracting a file recorded in a period substantially continuous in time series with a file being played back from the plurality of files and protecting writing of the extracted file.

DETAILED DESCRIPTION

Hereinafter, the present disclosure will be described through embodiments of the disclosure, but the disclosure according to the claims is not limited to the following embodiments. Further, not all of the configurations described in the embodiments are essential as means for solving the problem.

First Embodiment

First, a configuration of a recording device according to a first embodiment will be described. The recording device is, for example, a drive recorder.

Figure 1:
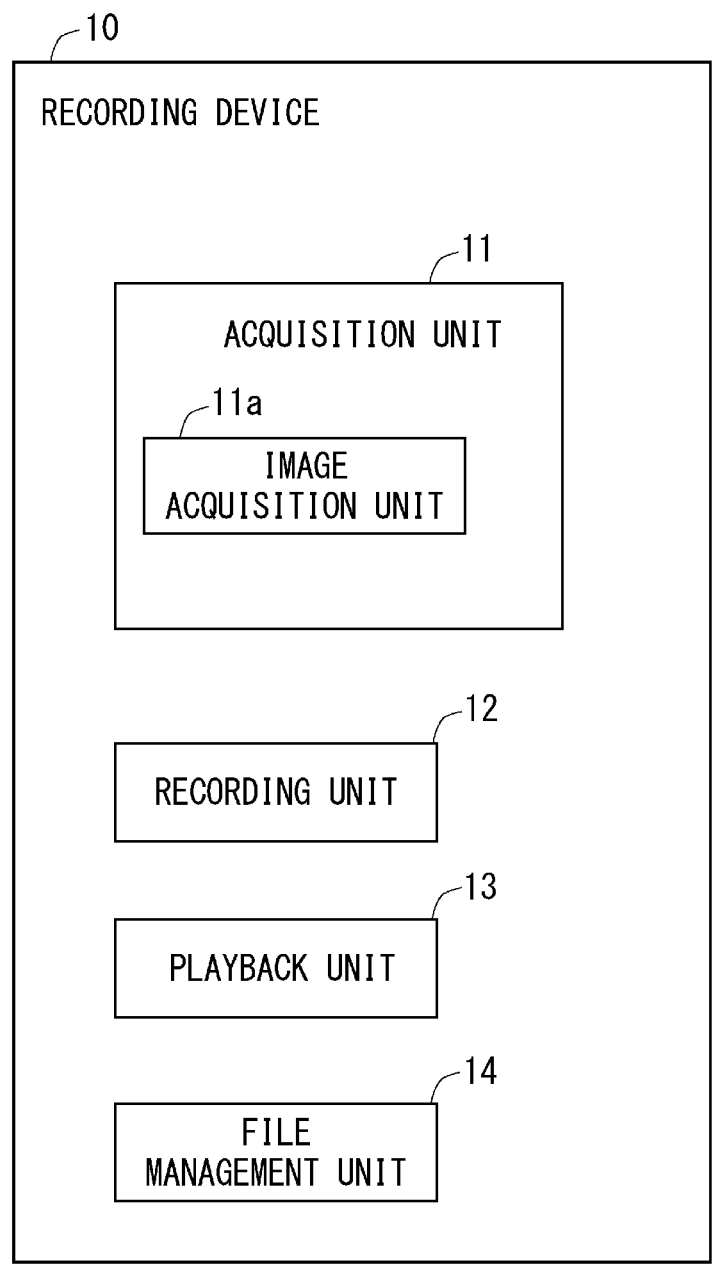
FIG. 1 is a block diagram showing a configuration of a recording device according to a first embodiment.

FIG. 1 is a block diagram showing a configuration of the recording device 10 according to the first embodiment. As shown in FIG. 1, the recording device 10 includes an acquisition unit 11, a recording unit 12, a playback unit 13, and a file management unit 14. The acquisition unit 11 acquires predetermined information.

The acquisition unit 11 may include an image acquisition unit 11a, such as a camera, for acquiring an image (captured image) around a vehicle, or may be an image input unit for inputting an image from another camera or the like. The predetermined information includes the image captured by the image acquisition unit 11a. The acquisition unit 11 may acquire voice information from a sound collection unit such as a microphone. The recording unit 12 records the predetermined information acquired by the acquisition unit 11 as a file. The playback unit 13 plays back a designated file among the plurality of files recorded in the recording unit 12. The file management unit 14 extracts a file recorded in a period continuous in time series with a file being played back from a plurality of files, and protects writing of the extracted file.

Figure 2:
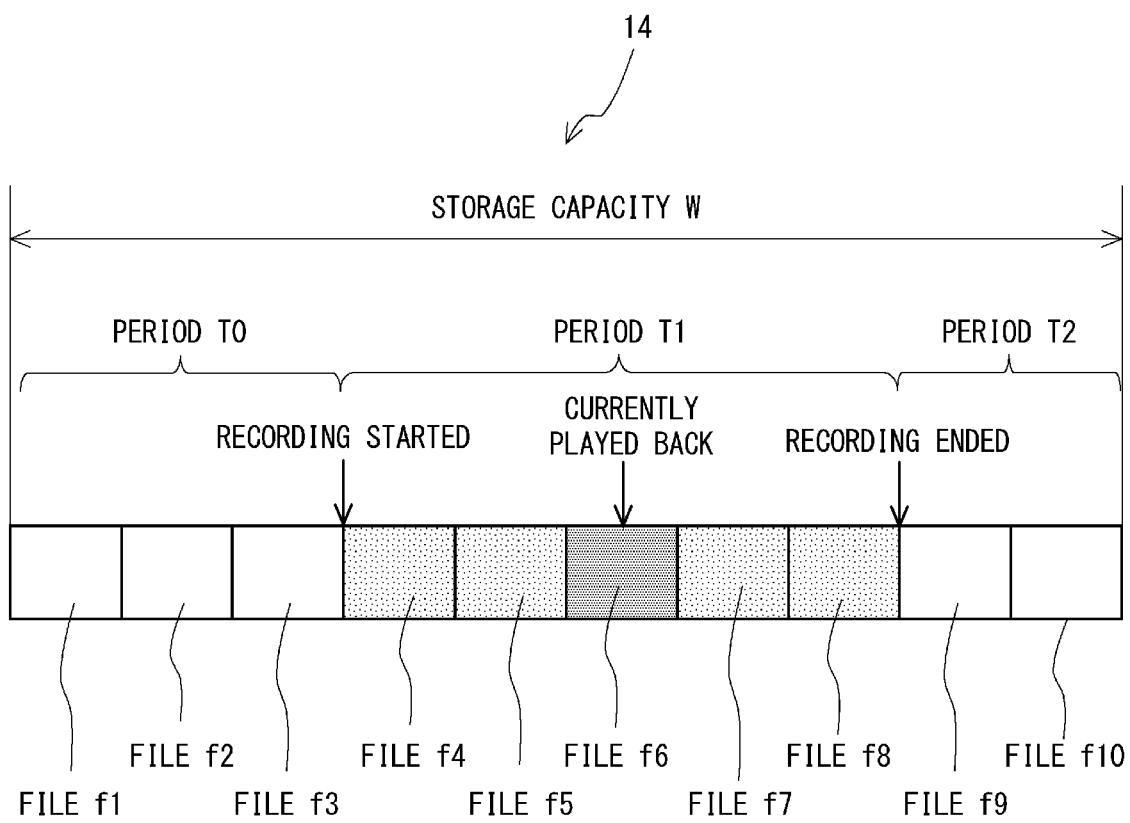
FIG. 2 is a schematic view for explaining processing in a file management unit of the recording device according to the first embodiment.

FIG. 2 is a schematic diagram for explaining processing in the file management unit 14. As shown in FIG. 2, it is assumed that the recording unit 12 is a storage medium having a storage capacity W. In the drive recorder, the image acquired by the acquisition unit 11 is recorded as an image file divided by, for example, every one minute or every three minutes. It is assumed that files f1 to f9 have been recorded in the recording unit 12, and the file f10 is currently being recorded. It is assumed that the file f6 is currently being played back.

The recording device 10 starts recording the predetermined information from the point of time when the recording device 10 is powered on or a manual recording switch is turned on, and ends recording when the recording device 10 is powered off or the manual recording switch is turned off. In a period T1 during which this series of recording is performed, the file at the start of recording is the file f4, and the file at the end of recording is the file f8. That is, the files f4 to f8 are recorded in a period continuous in time series with the file f6 being played back. In a period T0, the files f1 to f3 are recorded in a time series continuous period, and in a period T2, the files f9 to f10 are recorded in a time series continuous period. At this time, the files f3 and f4 and the files f8 and f9 are records that are not continuous in time series. For example, the period T0 is in the evening of the previous day, and the files f1 to f3 are image files captured in this period. The period T1 is in the morning of the day, and the files f4 to f8 are image files captured in this period. The period T2 is in the evening of the day, and the files f9 to f10 are image files captured in this period.

Therefore, the file management unit 14 (see FIG. 1) extracts the files 4 to 8, and protects writing of the extracted files. By doing so, the file f6 being played back and the files 4, 5, 7, and 8 related to the file f6 being played back can be prevented from being written. In this way, it is possible to prevent a file that is continuous in time series with the file currently being played back from being written and deleted, and it is possible to protect an image that follows the image being played back. On the other hand, the files 1 to 3, and the files 9 and 10 are set to be overwritable. As a result, after the recording of the file f10 is completed, the files f1, f2, f3, f9, and f10 are sequentially overwritten. By doing so, the storage capacity of the recording unit 12 can be effectively utilized.

Since a drive recorder is mounted on a vehicle, it is necessary to reduce the weight as much as possible, and commonly cannot have a very large storage capacity. Therefore, when the recording device 10 is a drive recorder, it is very advantageous to effectively utilize the storage capacity in the recording unit 12 as described above.

The acquisition unit 11 may include a road type information acquisition unit for acquiring information indicating the type of the road on which a vehicle is currently traveling. The recording unit 12 may record road type information in a file as one piece of the information acquired by the acquisition unit 11. The file management unit 14 may protect, from among the above extracted files, writing of the file whose recorded road type information matches the road type information recorded in the file currently being played back, and set the file whose recorded road type information is different from the road type information recorded in the file currently being played back to be overwritable. The road type is a type of road under the Road Act, such as a national expressway, a national highway, a prefectural road, or a municipal road. The type of the road can be determined, for example, by the acquisition unit 11 from information acquired from a car navigation system, information acquired from a GNSS (Global Navigation Satellite System), information about the operation of the vehicle acquired from a vehicle via a CAN (Controller Area Network), information obtained by analyzing the image, and the like.

In the example shown in FIG. 2, assuming that the files f5 and f7 have the same road type information as that of the file f6 being played back, the files f5 to f7 among the files f4 to f8 extracted by the file management unit 14 (see FIG. 1) are protected from being written. For example, it is considered that a series of scenes about road rage on an expressway or a main road is continued, and in many cases such scenes are not continued after the expressway is exited or after a deviation from the main road to a narrow street is made. Therefore, by protecting the files having the same road type information from being written, the scenes can be played back without any scene being missed. For example, if there are a plurality of pieces of the road type information recorded in a file, such as when a driver leaves the expressway while the file f7 is being recorded, it is preferable that the file be protected from being written if one of the plurality of pieces of road type information matches the road type information recorded in the file being played back.

On the other hand, among the extracted files f4 to f8, the files f4 and f8 are set to be overwritable, because the road type information of the files 4 and 8 is different from that of the files f5 to f7. In this way, the storage capacity of the recording unit 12 can be more effectively utilized.

The acquisition unit 11 may include a traffic congestion state acquisition unit for acquiring information indicating a traffic congestion state of a road the vehicle currently traveling. The recording unit 12 may record a traffic congestion state in a file as one piece of the information acquired by the acquisition unit 11. The file management unit 14 may protect, from among the above extracted files, writing of the file whose recorded traffic congestion level matches the traffic congestion level recorded in the file currently being played back, and set the file whose recorded traffic congestion level is different from the traffic congestion level recorded in the file currently being played back to be overwritable. The traffic congestion state acquisition unit classifies the levels of the congestion according to the congestion state, and may be used as information of the traffic congestion level. The traffic congestion state of the road can be determined, for example, by the acquisition unit 11 from information acquired from the car navigation system, information acquired from the GNSS, information about the operation of the vehicle acquired from the CAN, information obtained by analyzing the image, and the like.

In the example shown in FIG. 2, assuming that the files f5 and f7 have the same level of traffic congestion as that of the file f6 being played back, the files f5 to f7 among the files f4 to f8 extracted by the file management unit 14 (see FIG. 1) are protected from being written. For example, if there are a plurality of traffic congestion levels recorded in a file, such as when the traffic congestion state changes while the file f7 is being recorded, it is preferable that the file be protected from being written if one of the plurality of traffic congestion levels matches the traffic congestion level recorded in the file being played back. On the other hand, among the extracted files f4 to f8, the files f4 and f8 are set to be overwritable, because the traffic congestion state of roads of the files f4 and f8 is different from that of the files f5 to f7. In this way, the storage capacity of the recording unit 12 can be more effectively utilized.

The acquisition unit 11 may include a geographical name information acquisition unit for acquiring information indicating a geographical name of a location where the vehicle is currently traveling. The recording unit 12 may record geographical name information in a file as one piece of the information acquired by the acquisition unit 11. The file management unit 14 may protect, from among the above extracted files, writing of the file whose recorded geographical name information of a place where the vehicle is traveling matches the geographical name information recorded in the file currently being played back, and set the file whose recorded geographical name information is different from the geographical name information recorded in the file currently being played back to be overwritable. The geographical name of the place where the vehicle is traveling can be determined, for example, by the acquisition unit 11 from information acquired from the car navigation system, information acquired from the GNSS, information about the operation of the vehicle acquired from the CAN, information obtained by analyzing the image, and the like.

In the example shown in FIG. 2, assuming that the files f5 and f7 have the same geographical name information as that of the file f6 being played back, the files f5 to f7 among the files f4 to f8 extracted by the file management unit 14 (see FIG. 1) are protected from being written. For example, if there are a plurality of pieces of geographical name information recorded in a file, such as when the vehicle has crossed the prefectural border or city border and the geographical name information has changed while the file f7 is being recorded, it is preferable that the file be protected from being written if one of the plurality of pieces of geographical name information matches the geographical name information recorded in the file being played back. On the other hand, among the extracted files f4 to f8, the files f4 and f8 are set to be overwritable, because the geographical names of the files f4 and f8 are different from those of the files f5 to f7. In this way, the storage capacity of the recording unit 12 can be more effectively utilized.

The acquisition unit 11 may include a traffic regulation information acquisition unit for acquiring information indicating a regulation state of a road the vehicle is currently traveling. The recording unit 12 may record traffic regulation information in a file as one piece of the information acquired by the acquisition unit 11. The file management unit 14 may protect, from among the above extracted files, writing of the file whose recorded traffic regulation information of a place where the vehicle is traveling matches the traffic regulation information recorded in the file currently being played back, and set the file whose recorded traffic regulation information is different from the traffic regulation information recorded in the file currently being played back to be overwritable. The traffic regulation information of the road the vehicle is traveling is, for example, information shown on a road sign posted on the road the vehicle is traveling. The traffic regulation information of the road where the vehicle is traveling can be determined, for example, by the acquisition unit 11 from information acquired from the car navigation system, information acquired from the GNSS, information about the operation of the vehicle acquired from the CAN, information obtained by analyzing the image, and the like.

In the example shown in FIG. 2, assuming that the files f5 and f7 have the same traffic regulation information as that of the file f6 being played back, the files f5 to f7 among the files f4 to f8 extracted by the file management unit 14 (see FIG. 1) are protected from being written. For example, if there are a plurality of pieces of traffic regulation information recorded in a file, such as when the traffic regulation information has changed while the file f7 is being recorded, it is preferable that the file be protected from being written if one of the plurality of pieces of traffic regulation information matches the traffic regulation information recorded in the file being played back. On the other hand, among the extracted files f4 to f8, the files f4 and f8 are set to be overwritable, because the traffic regulation information of the files f4 and f8 is different from that of the files f5 to f7. In this way, the storage capacity of the recording unit 12 can be more effectively utilized.

The acquisition unit 11 may include other vehicle information acquisition unit for acquiring information about other vehicles traveling around the vehicle. The recording unit 12 may record the information about other vehicles in a file as one piece of the information acquired by the acquisition unit 11. The file management unit 14 may protect, from among the above extracted files, writing of the file whose recorded information about other vehicles matches the information about other vehicles recorded in the file currently being played back, and set the file whose recorded information about other vehicles is different from the information about other vehicles recorded in the file currently being played back to be overwritable. In this case, the file being played back includes information about other vehicles extracted from the image captured by the image acquisition unit 11a. A common image recognition technique can be used for the method for extracting the other vehicles from the image.

In the example shown in FIG. 2, if it is assumed that the files f5 and f7 have the same information as the file f6 being played back, the files f5 to f7 among the files f4 to f8 extracted by the file management unit 14 (see FIG. 1) are protected from being written. On the other hand, among the extracted files f4 to f8, the files f4 and f8 are set to be overwritable, because the information about other vehicles of the files f4 and f8 is different from that of the files f5 to f7. In this way, the storage capacity of the recording unit 12 can be more effectively utilized.

Next, a processing flow of the recording device 10 will be described. In the following description, FIG. 1 is also referred to as appropriate.

Figure 3:
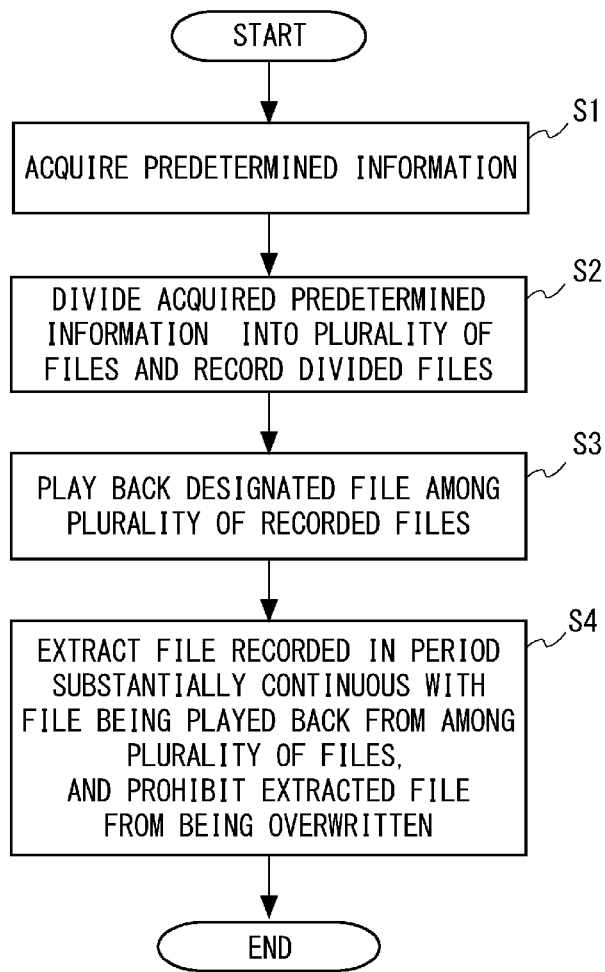
FIG. 3 is a flowchart showing a processing flow of the recording device according to the first embodiment.

FIG. 3 is a flowchart showing the processing flow of the recording device 10. As shown in FIG. 3, first, predetermined information is acquired (Step S1). Next, the acquired predetermined information is divided into a plurality of files and recorded (Step S2). Next, a designated file among the plurality of recorded files is played back (Step S3). Next, a file recorded in a period continuous with the file being played back is extracted from among the plurality of files, and the extracted file is protected from being written (Step S4).

As described above, according to the recording device 10 of this embodiment, it is possible to prevent writing of a file related to a file being played back. Further, by setting the number of the files to be protected from being written as few as possible, the storage capacity in the recording unit 12 can be effectively utilized.

Second Embodiment

Figure 4:
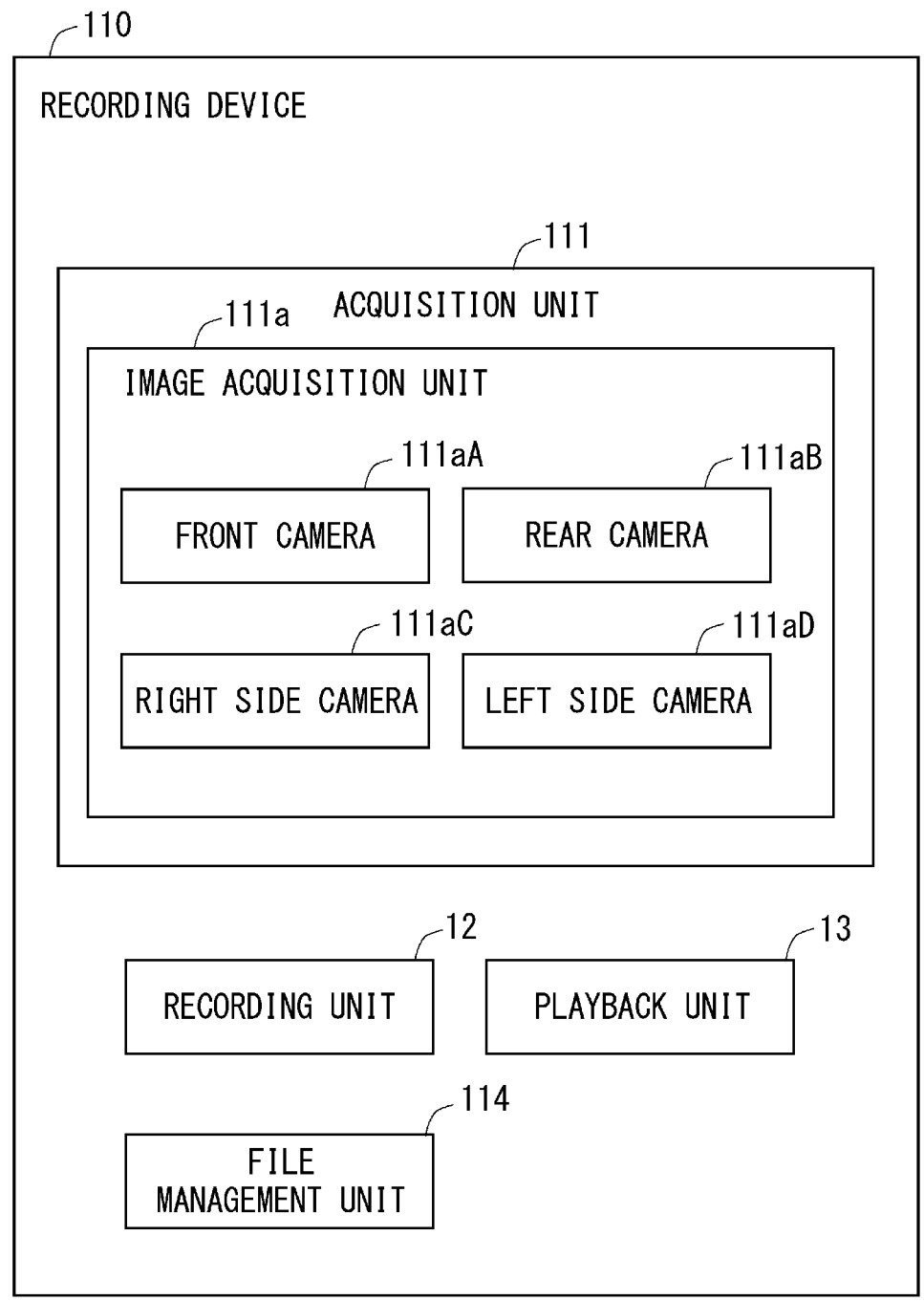
FIG. 4 is a block diagram showing a configuration of a recording device according to a second embodiment.

FIG. 4 is a block diagram showing a configuration of a recording device 110 according to a second embodiment. As shown in FIG. 4, the recording device 110 includes an acquisition unit 111, a recording unit 12, a playback unit 13, and a file management unit 114.

In the recording device 10 according to first embodiment, the image acquisition unit 11a of the acquisition unit 11 captures an image of the front (traveling direction) of the vehicle. On the other hand, in the recording device 110 according to the second embodiment, the image acquisition unit 111a of the acquisition unit 111 is composed of a plurality of cameras for capturing different directions around the vehicle. That is, the image acquisition unit 111a includes a front camera 111aA for capturing the front side of the vehicle, a rear camera 111aB for capturing the rear side thereof, a right side camera 111aC for capturing the right side thereof, and a left side camera 111aD for capturing the left side thereof.

The file management unit 114 extracts a file being played back and a file recorded in a time series continuous period from a plurality of files. The file management unit 114 protects writing of the extracted file, which is captured by the same camera as the camera which has captured the file being played back, and sets the extracted file, which is captured by a camera different from the camera which has captured the file being played back, to be overwritable.

The extracted files include files captured by the front camera 111aA, the rear camera 111aB, the right side camera 111aC, and the left side camera 111aD. For example, if a file captured by the front camera 111aA is being played back, the file captured by the front camera 111aA among the files recorded in a period continuous in time series with the file being played back is protected from being written. Even if the file is recorded in a period continuous in time series with the file being played back, the files captured by the rear camera 111aB, the right side camera 111aC, and the left side camera 111aD are set to be overwritable.

As described above, the recording device 110 according to this embodiment can prevent writing of a file captured by the same camera in a file recorded in a period continuous in time series with the file being played back. Further, the storage capacity in the recording unit 12 can be more effectively utilized.

The present disclosure is not limited to the above-described embodiments, and may be suitably modified without departing from the spirit. The plurality of examples described above may be implemented in combination as appropriate. For example, in the above embodiment, the recording device is described as a drive recorder, but the present disclosure is not limited thereto. The recording device may be any recording device such as a surveillance camera, a lifelog camera, a wearable camera, or the like, as long as the recording device deletes old files and overwrites when the capacity of the storage unit is exhausted. The recording device may be, for example, a device for recording voices, or an EDR (Event Data Recorder) for recording vehicle travel information or vehicle control information.

For example, although the file management unit 14 has been described that it extracts a file recorded in a time series continuous period, it may extract a file recorded in a time series continuous period if the period can be regarded as a substantially time series continuous period. Specifically, the recording may be interrupted when the engine of the vehicle is stopped at the time of dropping by a stop-off point for a few minutes while the vehicle is traveling. At this time, the file before the dropping-by and the file after the dropping-by may be files recorded in substantially continuous periods. In other words, even if the period is not continuous in time series, the period may be regarded as being substantially continuous with the time series if the interrupted period is shorter than a predetermined period.

The file management unit 14 may have a function of limiting the number or size of files to be extracted when a ratio of the capacity of the files extracted as files recorded in a time series continuous period to the storage capacity W of the recording unit 12 becomes larger than a predetermined ratio of the filed recorded to the storage capacity W of the recording unit 12. In this way, it is possible to have an enough capacity for recording a new file in the recording unit 12 and to effectively utilize the storage capacity in the recording unit 12.

The processing in each unit of the recording device according to the present disclosure can be implemented by causing a computer or the like to execute a program. More specifically, the program stored in the program memory for executing processing in each unit of a danger avoidance device is loaded into a main storage device, and the program is executed under the control of the CPU. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line. The processing in each unit of a navigation device is not limited to being implemented by software run by a program, and instead may be implemented by any combination of hardware, firmware, and software.

According to the present disclosure, it is possible to prevent writing of a file related to a file being played back.

What is claimed is:

1. A recording device comprising:
an acquisition unit configured to acquire predetermined information including at least an image acquisition unit that captures an image of an area around a vehicle, the predetermined information further including road information related to a road on which the vehicle is currently traveling;
a recording unit configured to record the predetermined information acquired by the acquisition unit as an image file;
a playback unit configured to play back a designated image file among a plurality of image files recorded in the recording unit; and
a file management unit configured to extract an image file recorded in a period substantially continuous in time series with an image file being played back from the plurality of image files and protect writing of the extracted image file, and further configured to protect, among the extracted files, writing of an image file having same road information as the road information recorded in the image file being played back, and set an image file having road information different from the road information recorded in the image file being played back to be overwritable.

2. The recording device according to claim 1, wherein the image file being played back includes information about other vehicles extracted from the image, and the file management unit is further configured to protect, among the extracted image files, writing of an image file having same information about other vehicle as the information about other vehicles recorded in the image file being played back, and set an image file having information about other vehicles different from the other vehicle information recorded in the image file being played back to be overwritable.

3. The recording device according to claim 1, wherein the acquisition unit is composed of a plurality of cameras, the cameras capturing areas around the vehicle from different directions, and the file management unit is further configured to protect, among the extracted image files, writing of an image file captured by a same camera as camera which has captured the image file being played back, and set an image file captured by a camera different from the camera which has captured the image file being played back to be overwritable.

4. A recording method comprising:
acquiring predetermined information including at least an image acquisition unit that captures an image of an area around a vehicle, the predetermined information further including road information related to a road on which the vehicle is currently traveling;

dividing the acquired predetermined information into a plurality of image files and recording the plurality of image files;

playing back a designated image file among the recorded plurality of image files;

extracting an image file recorded in a period substantially continuous in time series with an image file being played back from the plurality of image files and protecting writing of the extracted image file;

protecting, among the extracted files, writing of an image file having same road information as the road information recorded in the image file being played back; and setting an image file having road information different from the road information recorded in the image file being played back to be overwritable.

5. A non-transitory computer readable medium storing program for causing a computer to execute:

acquiring predetermined information including at least an image acquisition unit that captures an image of an area around a vehicle, the predetermined information further including road information related to a road on which the vehicle is currently traveling;

dividing the acquired predetermined information into a plurality of image files and recording the plurality of image files;

playing back a designated image file among the recorded plurality of image files;

extracting an image file recorded in a period substantially continuous in time series with an image file being played back from the plurality of image files and protecting writing of the extracted image file;

protecting, among the extracted files, writing of an image file having same road information as the road information recorded in the image file being played back; and setting an image file having road information different from the road information recorded in the image file being played back to be overwritable.

\* \* \* \* \*